H. S. ROSS.
Stuffing-Box.

No. 213,777.  Patented April 1, 1879.

Witnesses. John E. Darrow, Chas. H. Barns

H. Schuyler Ross
Inventor.

UNITED STATES PATENT OFFICE.

H. SCHUYLER ROSS, OF CHICAGO, ILLINOIS.

IMPROVEMENT IN STUFFING-BOXES.

Specification forming part of Letters Patent No. 213,777, dated April 1, 1879; application filed July 27, 1878.

*To all whom it may concern:*

Be it known that I, H. SCHUYLER ROSS, of the city of Chicago, county of Cook, and State of Illinois, have invented a new and useful Improvement in Stuffing-Boxes for Steam-Engines, of which the following is a specification:

To prevent the leakage of steam around rods or stems of steam-engines, I provide a system of packing, which consists of an annular grooved tube surrounding the rod, and provided at its inner end with a ball-and-socket-joint ring, and at its outer end a packing-receptacle, against which bears an adjustable cap, a second ball-and-socket ring being interposed between them. A spiral spring surrounds the tube, and presses it, by means of a shoulder, against the ball-and-socket ring and its seat, the receptacle for packing bearing against the opposite end of said spring and holding it in place.

The object of my invention is to provide a durable, efficient, accessible, and economical packing system for steam-engines.

Figure 1:
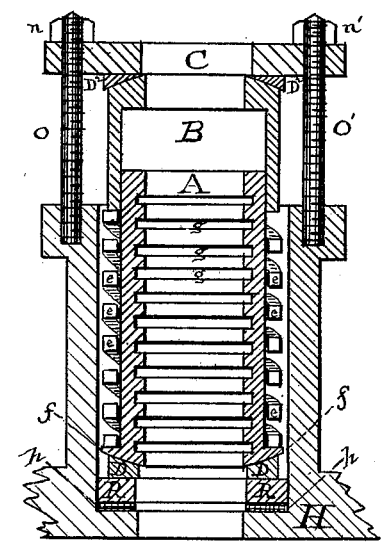
Figure 2:
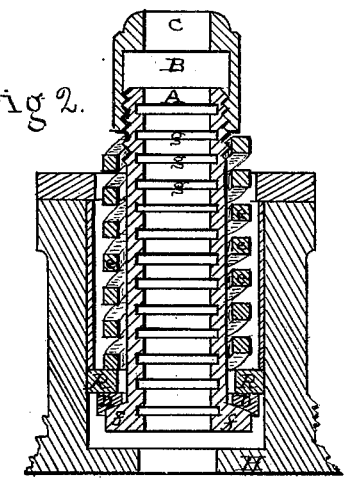
Figure 3:
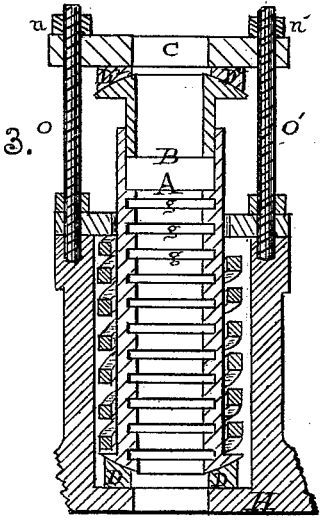

In the accompanying drawings, in which similar letters of reference indicate like parts, Figure 1 is a longitudinal section of my invention; Figs. 2 and 3, modifications of my invention.

The metal tube A is fitted closely to the rod or stem. Throughout the inside of this tube, at small intervals, are formed annular grooves $g\ g$, &c., varying in size according to the size of the rod and length of the tube. At the outer end of this tube is a packing receptacle or gland, B, which is adjustable by means of the cap C, bolts O O′, and nuts $n\ n'$.

Against the opposite or inner end of tube A is ground steam-tight a ring, D, having a concave face against the tube, the opposite face of such ring being flat and ground steam-tight against the cylinder-head H, or against an additional ring, R, interposed between it and the cylinder-head, for the purpose of making a gum or asbestus joint, $h$, between the cylinder-head and said ring R.

Coiled around the said tube A is a spiral spring, $e\ e$, the inner end of which bears against a shoulder, $f$, of the tube A, while its opposite or outer end is compressed by the packing receptacle or gland B. At the outer end of this gland or receptacle, and interposed between the cap C and the receptacle, is a second concaved and flat ring, $D^2$. The two rings D and $D^2$ thus placed at each end of the system permit a free play to the same, either laterally or angularly.

A tube with grooves is an old and well-known device to prevent leakage by diminishing pressure and condensing the steam.

My object in placing packing at the outer end of the tube is twofold—first, to act as an oil-gland, and, second, to prevent the passage of any steam that may leak or pass through all the grooves.

My invention does not consist of these devices separately, but when used in conjunction with joint ring or rings D $D^2$; and, further, in providing, in conjunction with a movable packing system, the auxiliary ring R and joint $h$ next the cylinder-head, to permit an easy application to the present form of cylinder-head, and to facilitate regrinding.

What I claim is—

1. In a stuffing-box, the combination of a tube, A, having annular grooves throughout its internal surface, with a flat and concaved ring, D, at its extremity.

2. A grooved tube, A, having a ring, D, with flat and concave faces at its inner end, in combination with an adjustable packing-receptacle, B, at its outer end.

3. A supplementary ring, R, with pliable joint $h$, when interposed between a movable packing system and the cylinder-head H, as and for the purpose described.

H. SCHUYLER ROSS.

Witnesses:
 JOHN E. DARROW,
 CHAS. W. BARNS.